United States Patent
Donner et al.

(10) Patent No.: US 10,026,212 B2
(45) Date of Patent: Jul. 17, 2018

(54) ELECTRONIC DISPLAY STABILIZATION USING PIXEL VELOCITIES

(71) Applicant: Google Inc., Mountain View, CA (US)

(72) Inventors: Craig Donner, Brisbane, CA (US); Paul Albert Lalonde, Sunnyvale, CA (US); Evan Hardesty Parker, Los Altos, CA (US)

(73) Assignee: Google LLC, Mountain View, CA (US)

( * ) Notice: Subject to any disclaimer, the term of this patent is extended or adjusted under 35 U.S.C. 154(b) by 247 days.

(21) Appl. No.: 14/946,983

(22) Filed: Nov. 20, 2015

(65) Prior Publication Data

US 2017/0148206 A1   May 25, 2017

(51) Int. Cl.
| | |
|---|---|
| *G06K 9/00* | (2006.01) |
| *G06T 15/04* | (2011.01) |
| *G06T 19/00* | (2011.01) |
| *G06T 7/20* | (2017.01) |
| *G06T 7/40* | (2017.01) |
| *G06F 3/01* | (2006.01) |

(Continued)

(52) U.S. Cl.
CPC .......... *G06T 15/04* (2013.01); *G02B 27/0093* (2013.01); *G02B 27/017* (2013.01); *G02B 27/0172* (2013.01); *G02B 27/0179* (2013.01); *G06F 3/011* (2013.01); *G06F 3/012* (2013.01); *G06F 3/038* (2013.01); *G06F 3/0346* (2013.01); *G06T 7/2086* (2013.01); *G06T 7/408* (2013.01); *G06T 19/006* (2013.01); *H04N 13/344* (2018.05); *H04N 13/376* (2018.05); *G02B 2027/014* (2013.01); *G02B 2027/0132* (2013.01); *G02B 2027/0187* (2013.01); *G06T 2200/04* (2013.01)

(58) Field of Classification Search
None
See application file for complete search history.

(56) References Cited

U.S. PATENT DOCUMENTS 5,627,905 A    5/1997   Sebok et al.
6,480,615 B1 *  11/2002  Sun .................... G06T 7/215
                                                    382/103

(Continued)

OTHER PUBLICATIONS

U.S. Appl. No. 62/174,602, filed Jun. 12, 2015, listing Evan Hardesty Parker et al. as inventors, entitled "Electronic Display Stabilization for Head Mounted Display,".

(Continued)

*Primary Examiner* — Sean Conner

(57) ABSTRACT

A system includes a head mounted display (HMD) device comprising at least one display and at least one sensor to provide pose information for the HMD device. The system further includes a sensor integrator module coupled to the at least one sensor, the sensor integrator module to determine a motion vector for the HMD device based on the pose information, and an application processor to render a first texture based on pose of the HMD device determined from the pose information. The system further includes a motion analysis module to determine a first velocity field having a pixel velocity for at least a subset of pixels of the first texture, and a compositor to render a second texture based on the first texture, the first velocity field and the motion vector for the HMD, and to provide the second texture to the display of the HMD device.

24 Claims, 4 Drawing Sheets

(51) Int. Cl.
G02B 27/01 (2006.01)
G02B 27/00 (2006.01)
H04N 13/344 (2018.01)
H04N 13/376 (2018.01)
G06F 3/038 (2013.01)
G06F 3/0346 (2013.01)

(56) References Cited

U.S. PATENT DOCUMENTS

| | | | |
|---|---|---|---|
| 7,724,258 | B2 | 5/2010 | Ebert et al. |
| 8,773,448 | B2 | 7/2014 | Lalonde et al. |
| 8,823,746 | B2 | 9/2014 | Jones et al. |
| 2006/0087509 | A1 | 4/2006 | Ebert et al. |
| 2006/0244757 | A1 | 11/2006 | Fang et al. |
| 2008/0001963 | A1 | 1/2008 | Lefebvre et al. |
| 2012/0223833 | A1 | 9/2012 | Thomas et al. |
| 2014/0176591 | A1* | 6/2014 | Klein ............... G09G 3/003 345/589 |
| 2014/0267350 | A1 | 9/2014 | Kass et al. |
| 2014/0362113 | A1* | 12/2014 | Benson ............ G02B 27/0172 345/633 |
| 2015/0262336 | A1* | 9/2015 | Jin .................... G06T 3/4053 382/275 |
| 2015/0310665 | A1 | 10/2015 | Michail et al. |
| 2016/0189429 | A1 | 6/2016 | Mallinson |
| 2016/0282619 | A1 | 9/2016 | Oto |

OTHER PUBLICATIONS

Oculus VR, LLC, Blog—Asynchronous Timewarp Examined, Posted by Michael Antonov, <http://developer.oculus.com/blog/asynchronous-timewarp-examined/>, Accessed Oct. 22, 2015, 11 pages.
Valve Software, Blog—Down the VR Rabbit Hole: Fixing Judder, Posted by Michael Abrash, <http://blogs.valvesoftware.com/abrash/down-the-vr-rabbit-hole-fixing-judder/>, Accessed Oct. 22, 2015, 32 pages.
Daniel Weiskopf, et al., "A Case Study on Hardware-Accelerated Langrangian-Eulerian Texture Advection for Flow Visualization," Visualization and Interactive Systems Group, University of Stuttgart, Germany and School of Computational Science and Information Technology, Florida State University, pp. 1-4.
Valve Software, Blog—Why Virtual Isn't Real to Your Brain, Posted by Michael Abrash, <http://blogs.valvesoftwarwe.com/abrash/why-virtual-isn't-real-to-your-brain/>, Accessed Oct. 22, 2015, 21 pages.
Non-Final Office Action dated Aug. 16, 2017 for U.S. Appl. No. 15/180,819, 39 pages.
International Search Report and Written Opinion correlating to PCT/US2016/037203 dated Sep. 21, 2016, 45 pages.
Didier, et al., "A Time Delay Compensation Method Improving Registration for Augmented Reality", Robotics and Automation, Apr. 18, 2005, 6 pages.
Mark, et al., "Post-rendering 3D warping", Proceedings of the 1997 Symposium on Interactive 3D Graphics, Jan. 1, 1997, 10 pages.
Azuma, et all., "Improving Static and Dynamic Registration in an Optical See-Through HMD", SIGGRAPH Conference Proceedings, Jan. 1, 1994, 17 pages.
U.S. Appl. No. 15/180,819, filed Jun. 13, 2016, listing Evan Hardesty Parker, et al. as inventors, entitled "Electronic Display Stabilization for Head Mounted Display".
International Search Report and Written Opinion for PCT Patent Application No. PCT/US2016/055528 dated Jan. 11, 2017, 9 pages.
International Preliminary Report on Patentability dated Dec. 12, 2017 for PCT Application No. PCT/US2016/037203, 8 pages.
Final Office Action dated Nov. 27, 2017 for U.S. Appl. No. 15/180,819, 28 pages.
Notice of Allowance dated Feb. 5, 2018 for U.S. Appl. No. 15/180,819, 8 pages.
International Preliminary Report on Patentability dated May 31, 2018 for PCT Application No. PCT/U52016/055528, 7 pages.

* cited by examiner

US 10,026,212 B2

ELECTRONIC DISPLAY STABILIZATION USING PIXEL VELOCITIES

FIELD OF THE DISCLOSURE

The present disclosure relates generally to head mounted display systems and more particularly to reduced-latency motion compensation and stabilization in head mounted display systems.

BACKGROUND

A virtual reality (VR) system replicates an environment that simulates physical presence in places in the real world or an imagined world using entirely-computer-generated three-dimensional (3D) imagery of "scenes" within this world. Similarly, an augmented reality (AR) system "augments" physical presence in the real world through computer-generated 3D imagery that overlies contemporaneously captured imagery of the real world. Thus, VR and AR systems both seek to provide an accurate sense of "presence" in the real, augmented, or imagined world. Typically, this sense of presence is facilitated through the use of a head mounted display (HMD) device that provides separate left-eye and right-eye displays. The displays together present a stereoscopic, or 3D, representation of a scene in the represented world, where the presented scene reflects the user's relative perspective of the scene based on the user's current pose (that is, the location and orientation of the user's head relative to a reference coordinate frame for the depicted scene).

HMD-based VR and AR systems display 3D imagery as a sequence of display textures (or "frames"), each display texture rendered based on a corresponding detected head pose and persisting for a particular period of time. However, as an HMD device generally permits a user to move freely about, the user's head may have perceptibly moved in the time between the initiation of the rendering of a texture and the display of the resulting rendered texture. As such, the imagery displayed at the HMD device at a particular point in time may lag behind the user's head movements. Further, virtual objects in the scene may be "in motion" and thus the rendered positions of the virtual objects may differ from where the objects should appear if the frame was rendered at the correct time. This dissonance between the user's perceived orientation within a scene, as well as perceived orientation of objects within that scene, and the actual orientation of the scene and objects contained therein can lead to user disorientation or discomfort, or what is often referred to as "virtual reality sickness". Thus, to reduce or eliminate user discomfort and thereby provide improved presence, HMD-based VR and AR systems seek to minimize the motion-to-photon latency; that is, the latency between a user head/eye movement and when photons representing a scene from the resulting new pose hit the user's eye.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving HMD-based AR and VR display systems. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

Figure 1:
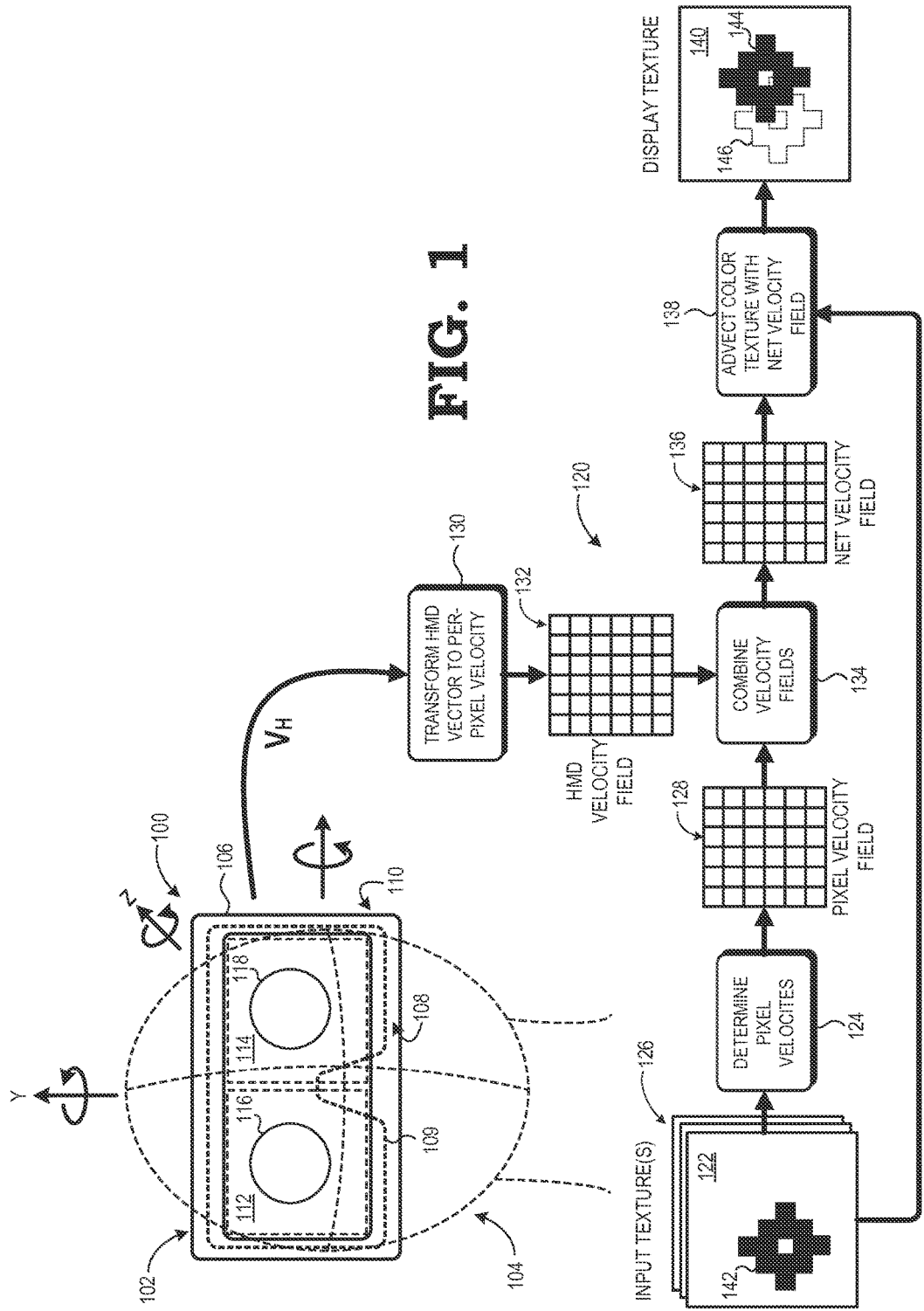
FIG. 1 is a diagram illustrating a head mounted display (HMD)-based display system implementing pixel-velocity-based electronic display stabilization (EDS) in accordance with at least one embodiment of the present disclosure.

FIG. 1 illustrates an HMD-based display system 100 for providing VR or AR presence in the real world or an imagined world in accordance with at least one embodiment of the present disclosure. The display system 100 includes an HMD device 102 coupled to the movements of a user's head 104. Typically, as implied by the term "mounted" in "head mounted display" the HMD device 102 includes an apparatus strapped to, or otherwise mounted on, the user's head 104 such that the HMD device 102 is fixedly positioned in proximity to the user's face and thus moves with the user's movements. However, in some circumstances a user may hold a tablet computer or other hand-held device up to the user's face and constrain the movement of the hand-held device such that the orientation of the hand-held device to the user's head is relatively fixed even as the user's head 104 moves. In such instances, a hand-held device operated in this manner also may be considered an implementation of the HMD device 102 even though it is not "mounted" via a physical attachment to the user's head 104.

The HMD device 102 comprises a housing 106 having a surface 108 opposite another surface 110, as well as a face gasket 109 and set of straps or a harness (omitted from FIG. 1 for clarity) to mount the housing 106 on the user's head 104 so that the user faces the surface 108 of the housing 106. In the depicted embodiment, the HMD device 102 is a binocular HMD and thus has a left-eye display 112 and a right-eye display 114 disposed at the surface 108. The displays 112, 114 may be implemented as separate display devices (that is independent display arrays driven by separate display driver hardware components) or the displays 112, 114 may be implemented as logically-separated regions of a single display device (e.g., a single display array logically divided into left and right "halves"). In other embodiments, a single display may be implemented, or more than two displays may be implemented. The housing 106 further includes an eyepiece lens 116 aligned with the left-eye display 112 and an eyepiece lens 118 aligned with the right-eye display 114. Alternatively, in some embodiments, the HMD device 102 may be implemented as a monocular HMD in that a single image is presented to both eyes of the user, either through left and right eyepiece lenses 116, 118, or directly without an intervening lens.

As described in greater detail below, the display system 100 further includes an imagery rendering system to generate imagery for display at the HMD device 102. In some embodiments, the components of the imagery rendering system are primarily implemented within the HMD device 102 itself. For example, the HMD device 102 may comprise the computing system that executes a VR/AR application that renders the resulting imagery, and the HMD device 102 may be connected through a wireless or wired connection to a local or remote computing device that provides various data associated with the VR/AR application, such data describing objects to be rendered in a scene, the parameters of other users (e.g., location) operating in the same world space, and the like. In other embodiments, some or all of the components of the image rendering system are implemented external to the HMD device 102, and the data representing the imagery for display may be supplied to the HMD device 102 via a wired or wireless connection.

In operation, the display system 100 executes a VR or AR application that determines the current pose (that is, one or both of position and rotational orientation) of the HMD device 102 (and thus the user's head 104) relative to a reference coordinate frame (that is, "world space") and then generates imagery of a scene from a perspective associated with that pose (that is, "screen space"). That is, the display system 100 generates and displays imagery that maps the world space to the screen space of the HMD device 102 based on the determined pose of the HMD device 102. The displayed imagery may be completely computer-generated (that is, VR imagery), or the imagery may be a combination of imagery captured of the local environment (e.g., imagery captured via one or more image sensors mounted on the HMD device 102) and an AR overlay that is rendered so as to reflect the current user pose, or the imagery may be an AR overlay on a transparent "display" through which the local environment is viewable. As shown in FIG. 1, in implementations with both a left-side display and a right-side display, left-eye-specific imagery may be rendered and displayed in the left-eye display 112 concurrent with the rendering and display of right-eye-specific imagery in the right-eye display 114, thereby enabling a stereoscopic 3D display of scene represented by the displayed imagery.

As the HMD device 102 is mounted on the user's head 104, or otherwise constrained so as to move in concert with the user's head, the HMD device 102 is subject to considerable motion during operation, with this motion in the form of translation along one or more axes (e.g., the depicted x, y, and z axes) and/or rotation along the one or more axes (e.g., the depicted roll, pitch, and yaw). Further, as described above, the displayed imagery may contain objects "in motion" (that is, changing position relative to the virtual world space). The motion of the HMD device 102, the motion of objects in the displayed imagery, when combined with the rendering and display latency of the display system 100, can result in substantial user disorientation unless otherwise mitigated. To this end, the display system 100 utilizes an electronic display stabilization (EDS) process 120 to compensate for both the interim motion of the HMD device 102 as well as the interim motion of the displayed objects.

FIG. 1 further summarizes the EDS process 120 employed by the display system 100 in accordance with at least one embodiment. As illustrated, the display system 100 renders input textures 122 (also commonly referred to as a "frame" or an "image") for each of the displays 112, 114 at a particular rate X frames per second (fps), such as at a rate of 30 fps, 60 fps, 120 fps, etc. In at least one embodiment, the display system 100 renders each of the textures 122 based on a pose of the HMD device 102 for the point in time with the corresponding texture 122. Each set of two or more textures 122 together represents a view of a 3D scene at a corresponding point in time. To illustrate, the display system 100 may update the pose of the HMD device 102 at a rate of, for example, 30 updates per second, or one update every 33.33 milliseconds (ms), whereas the textures 122 are rendered at a rate of, for example, 120 fps, and thus the updated HMD pose generated every 33.33 ms is used for rendering the four textures 122 generated for each eye in that same period.

As each input texture 122 is rendered, the display system 100 performs a motion analysis process 124 to determine a velocity, Vp, for each pixel in the input texture 122. As described below, in some embodiments, this velocity information may be supplied by the application rendering the input texture 122. That is, the velocities of the objects represented in the imagery may be pre-identified or otherwise known at the time of rendering, and this information may be supplied by the application responsible for the rendering of the input textures 122. In other embodiments, the pixel velocities for an input texture 122 may be determined through a pixel motion estimation technique, such as through application of an optical flow analysis to a sequence 126 of two or more textures 122, including the current texture 122 being processed and one or more previously rendered textures 122.

The pixel velocities Vp for the pixels of the texture 122 may be organized or represented as a pixel velocity field 128, which may be implemented as an array of entries, each entry storing a pixel velocity for a corresponding pixel at a corresponding location within the texture 122. Further, in some embodiments the display system 100 may implement a depth buffer, a deep frame buffer, or other mechanism for tracking the depth of different fragments, and thus each pixel of the texture 122 may represent one or more fragments, and even may represent discarded fragments (since they may become disoccluded in the future due to motion of pixels/virtual objects). Accordingly, the motion analysis process 124 may include determining the pixel velocity for a pixel for each of the fragments which may be represented by that pixel, and thus the velocity field 128 may store a pixel velocity for each fragment of multiple fragments per pixel. As such, each entry of the array representing the pixel velocity field 128 may store multiple pixel velocities, one for each fragment represented by the pixel associated with that entry.

In parallel with the motion analysis process 124, the display system 100 performs a HMD motion conversion process 130 whereby the display system 100 samples one or more motion-based sensors (e.g., gyroscope, accelerometer, magnetometer, etc.) to determine a current motion vector, denoted "$MV_{HMD}$", of the HMD device 102 relative to the world space. In some embodiments, this current motion vector $MV_{HMD}$ may comprise a three-degree-of-motion (3DoF) vector representing the velocity, or derivative, of translation of the HMD device 102 along one or more of the x, y, and z axes or a 3DoF vector representing the velocity of rotation of the HMD device 102 around one or more of the x, y, and z axes (that is, roll, pitch, and yaw). In other embodiments, the current motion vector $MV_{HMD}$ comprises a six-degree-of-freedom (6DoF) motion vector representing the derivatives of both the translation and rotation of the HMD device 102. In some embodiments, the current motion vector $MV_{HMD}$ may be calculated as an instantaneous motion vector, while in other embodiments the current motion vector $MV_{HMD}$ may be calculated as a predicted motion vector, that is, a prediction of the motion of the HMD device 102 at a future time (e.g., at the future point of time when the current texture 122 would be expected to be displayed).

After determining the current motion vector $MV_{HMD}$, the HMD motion conversion process 130 converts the current motion vector $MV_{HMD}$ to a per-pixel velocity representation of the motion of the HMD device 102 in the screen space, resulting in an HMD velocity field 132, which, like the pixel velocity field 128, may be implemented or represented as an array or matrix of entries, each entry associated with a corresponding pixel position and storing a value representing a velocity, denoted "Vh", for the corresponding pixel.

The display system 100 then performs a velocity combination process 134 whereby the pixel velocity field 128 and the HMD velocity field 132 are combined to generate a net velocity field 136. The net velocity field 136 represents the net relative velocity of each pixel when considering both the velocity of the pixel in the rendered imagery and the velocity of the HMD device 102. Thus, as with the velocity fields 128, 132, the net velocity field 136 may be implemented as, or represented by, an array or matrix of entries, each entry associated with a corresponding pixel position and storing a net pixel velocity, Vnet, representing the net velocity between the pixel velocity Vp for that pixel position and the HMD velocity Vh for that pixel position (i.e., Vnet=Vp+Vh). In the event that multiple fragments are represented by the pixel, the entry may store a net pixel velocity Vnet for each fragment, calculated using the pixel velocity Vp for that fragment.

With the net per-pixel velocities so calculated, the display system 100 performs a texture advection process 138 whereby the color information for the pixels of the current input texture 122 is advected or otherwise modified based on the net velocity field 136 to generate a corresponding display texture 140 that compensates for both the interim motion of the user's head as represented by the motion vector $MV_{HMD}$ and the interim motion of the virtual objects in the displayed imagery. In the event that per-pixel depth information is also included with, or associated with, the input texture 122, the depth information is advected in the same manner. To illustrate, assume for example that the current input texture 122 includes a virtual object 142 composed of a group of pixels at the indicated position in screen space but has a slight velocity to the right. Further, assume that the current motion of the user's head, and thus the HMD device 102, is a slight drift leftward and downward. The resulting net velocity of the virtual object 142, that is, the net motion of the virtual object 142 relative to the user's perspective in world space, is a rightward and slight upward drift. Thus, as a result of the advection of the current input texture 122 using the net velocity field 136, the pixels representing the virtual object 142 are shifted rightward and upward in the resulting display texture 140, thus presenting the virtual object 142 at a motion-compensated position 144 in screen space relative to the original position 146 of the virtual object 142 as found in the current input texture 122. The display texture 140 then may be subjected to a re-projection process (relative to screen space) to construct the final image to be displayed at the HMD device 100.

In implementations with separate right-eye and left-eye imaging, the EDS process 120 is performed in parallel for the one or more textures prepared for each eye, resulting in a pair or other set of display textures 140 which are synchronously scanned out to their respective displays 112, 114 of the HMD device 102. In implementations with monocular display, the EDS process 120 generates a single display texture 140, which is then scanned out to the single display of the HMD device 102.

Assuming there is some net velocity for at least some pixels, the texture advection process 138 has the result of shifting the position of various pixels to reflect the net change in velocity due to the combination of pixel velocity and HMD velocity for the time span representing initiation of the rendering of the input texture 122 and the scan out of the corresponding display texture 140 to the corresponding display. As noted above, the input texture 122 may represent multiple fragments at different depths, and thus the texture advection process 138 may be performed for each fragment, or depth level. As such, the shifting in position of pixels may result in disocclusion of fragments that were previously obscured by "closer" fragments in the original input texture 122. In such instances, the rendering process implemented by the display system 100 can further include implementation of a disocclusion process to remove any disocclusion errors that may result from the texture advection process 138.

As described above, the input texture 122 is rendered based on the pose of the HMD device 102 that is sampled at the time of rendering. However, additional motion of the HMD device 102 may occur between the initiation of rendering of the input texture 122 and the scan-out or display of the image represented by the texture 122. Thus, by the time the input texture 122 is displayed, it may not accurately reflect the actual orientation of the HMD device 102 at that time, and thus may not accurate reflect the user's current perspective of the scene. Further, the input texture 122 may represent virtual objects in motion, and thus the user may expect the virtual objects to be in different positions, relative to the world space, by the time the input texture 122 would be displayed compared to the actual positions of the virtual objects represented in the input texture 122. However, by calculating the per-pixel net velocities and then advecting the color information for the pixels of the input texture 122, the resulting display texture 140 more accurately reflects the anticipated perspective of the user at the time of display of the display texture 140, as well as more accurately reflecting the anticipate position of in-motion virtual objects at the time of display of the display texture 140.

The display system 100 may employ the EDS process 120 in combination with one or more display stabilization processes that attempt to compensate for interim motion between render time and display time. For example, the display system 100 may additional employ the EDS process of U.S. Patent Application Ser. No. 62/174,602, filed on 12 Jun. 2015 and entitled "Electronic Display Stabilization for Head Mounted Display"), the entirety of which is incorporated by reference herein.

Figure 2:
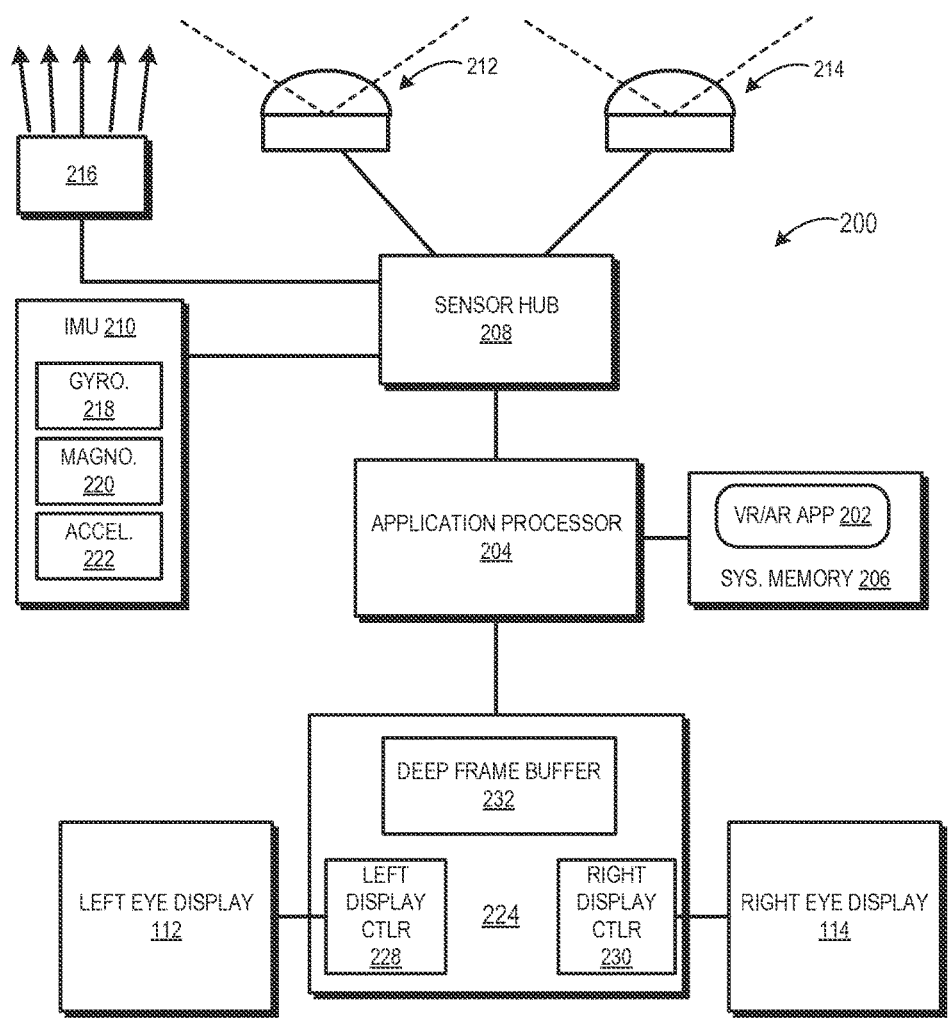
FIG. 2 is a block diagram illustrating a hardware configuration of the HMD-based display system of FIG. 1 in accordance with at least one embodiment of the present disclosure.

FIG. 2 illustrates an example hardware configuration 200 of the display system 100 of FIG. 1 in accordance with at least one embodiment of the present disclosure. The hardware configuration 200 includes hardware directed to the execution of a VR or AR application (referred to herein as "VR/AR application 202") so as to render VR or AR content representing scenes from current poses of the user's head 104 or the HMD device 102, the VR or AR content comprising a sequence of textures for each eye. The hardware configuration 200 further includes EDS hardware directed to the display of the VR or AR content represented by the sequence of textures and which implements the EDS process 120 to as to compensate for interim head rotation between rendered textures as well as interim movement of in-motion virtual objects present in the video represented by the rendered textures.

In the depicted example, the hardware configuration 200 includes an application processor 204, a system memory 206, a sensor hub 208 (which may be a separate component or as functionality implemented by the application processor 204), and an inertial management unit (IMU) 210. In some embodiments, the HMD device 102 may incorporate image capture for purposes of visual localization or visual telemetry, or for real-time display of imagery captured of the local environment in support of AR functionality. In such embodiments, the hardware configuration 200 further may include, for example, one or more image sensors 212, 214 and a structured-light or time-of-flight (ToF) depth sensor 216.

The IMU 210 comprises one or more inertial sensors that provide pose information about the HMD device 102 or otherwise facilitate tracking of the pose of the HMD device 102, including, for example, a gyroscope 218, a magnetometer 220, and an accelerometer 222. The Sensortec™ BMI160 from Bosch Gmbh is an example of a commercially-available implementation of the IMU 210. The sensor hub 208 is coupled to the IMU 210, the imaging sensors 212, 214, and the depth sensor 216, and operates to manage the transfer of control signaling and data between the application processor 204 and the IMU 210, the imaging sensors 212, 214, the depth sensor 216, and other sensors of the display system 100. The Myriad™ 2 vision processing unit (VPU) from Movidius Ltd. is an example of a commercially-available implementation of the sensor hub 208. The application processor 204 comprises one or more central processing units (CPUs), graphics processing units (GPUs), or a combination of one or more CPUs and one or more GPUs. The Snapdragon™ 810 MSM8994 system-on-a-chip (SoC) from Qualcomm Incorporated is an example of a commercially-available implementation of the application processor 204.

The hardware configuration 200 further includes a compositor 224, the left-eye display 112, and the right-eye display 114. The compositor 224 is a device that may be implemented as, for example, an ASIC, programmable logic, as one or more GPUs executing software that manipulates the one or more GPUs to provide the described functionality, or a combination thereof. The hardware configuration 200 further includes a left display controller 228 for driving the left eye display 112 and a right display controller 230 for driving the right eye display 114, and which are illustrated as part of the compositor 224. The compositor 224 further may include a deep frame buffer 232 for storing one or more textures for each of the left eye display pipeline and right eye display pipeline, as well the depth fields and velocity fields associated therewith, as described herein.

In operation, the application processor 204 executes the VR/AR application 202 (stored in, for example, the system memory 206) to provide VR/AR functionality for a user. As part of this process, the VR/AR application 202 manipulates the application processor 204 or associated processor to render a sequence of textures (e.g., input textures 122, FIG. 1) for each eye at a particular render rate. Each texture contains visual content that may be entirely computer generated, visual content that is a combination of captured imagery (via the imaging sensors 212, 214) and a computer-generated overlay, or a computer-generated overlay displayed over a transparent display panel or window into the local environment. The visual content of each texture represents a scene from a corresponding pose of the user's head (or pose of the HMD device 102) at the time that the texture is determined. Thus, in preparation for rendering each texture, the application processor 204 obtains the current samples from the gyroscope 218, the magnetometer 220, and the accelerometer 222 of the IMU 210 and determines the current pose of the user's head from these inertial sensor readings. Instead of, or in addition to, using the IMU 210 for determining the current pose and rotation, the application processor 204 may use the information from one or more imaging sensors or depth sensors to determine, verify, or revise the current pose and rotation using one or more visual telemetry or simultaneous localization and mapping (SLAM) techniques. From the determined head pose, the application processor 204 renders a pair of input textures that together represent the stereoscopic view of the scene from the determined head orientation and rotation. The pair of rendered input textures is then stored in the deep frame buffer 232, which may be part of the system memory 206 or a separate graphics memory.

In parallel, the compositor 224 operates to generate display textures (e.g., display texture 140, FIG. 1) based on rendered textures and drive the displays 112, 114 based on the generated display textures. As part of this process, the compositor 224 implements the EDS process 120 described herein to determine per-pixel net velocities from the per-pixel velocities present in the input textures and the current motion of the HMD device 102 and modify the pair of input textures to reflect these per-pixel net velocities so as to generate a pair of display textures that are more closely aligned with the net motion between the motion of the user's head 104 and the movement of the virtual objects represented in the imagery at the time that the display textures are displayed at the displays 112, 114.

Figure 3:
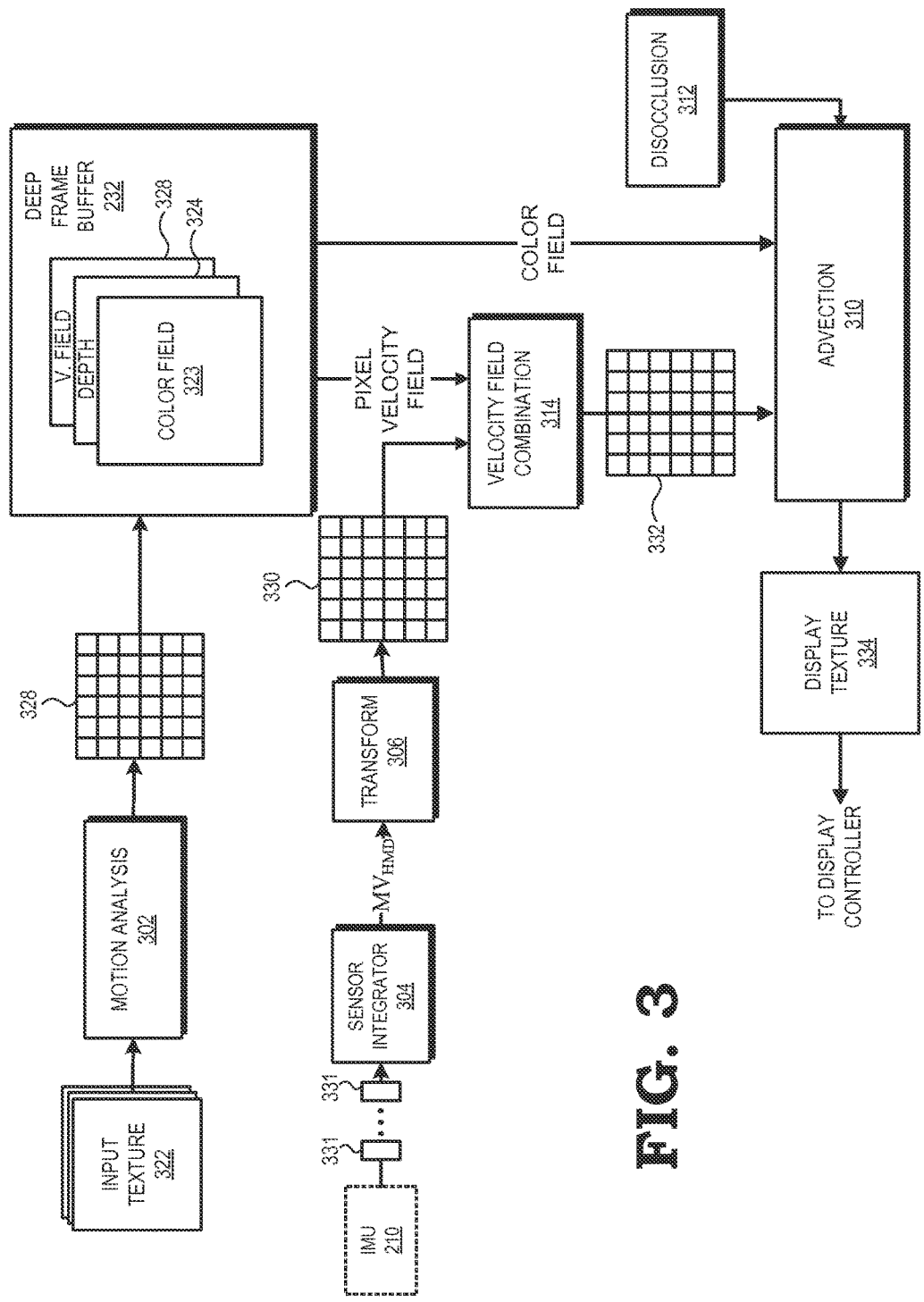
FIG. 3 is a block diagram illustrating a compositor of the HMD-based display system of FIG. 2 in greater detail in accordance with at least one embodiment of the present disclosure.

FIG. 3 illustrates an example implementation of the compositor 224 in accordance with at least one embodiment of the present disclosure. In the depicted example, the compositor 224 includes the deep frame buffer 232, a motion analysis module 302, a sensor integrator module 304, a transform module 306, a velocity field combination module 308, an advection module 310, and a disocclusion module 312. The modules 302, 304, 306, 308, 310, and 312 each may be implemented as part of an ASIC or programmable logic, as one or more processors executing corresponding software, or a combination thereof. The operations of these components are described in greater detail with reference to FIG. 4.

Figure 4:
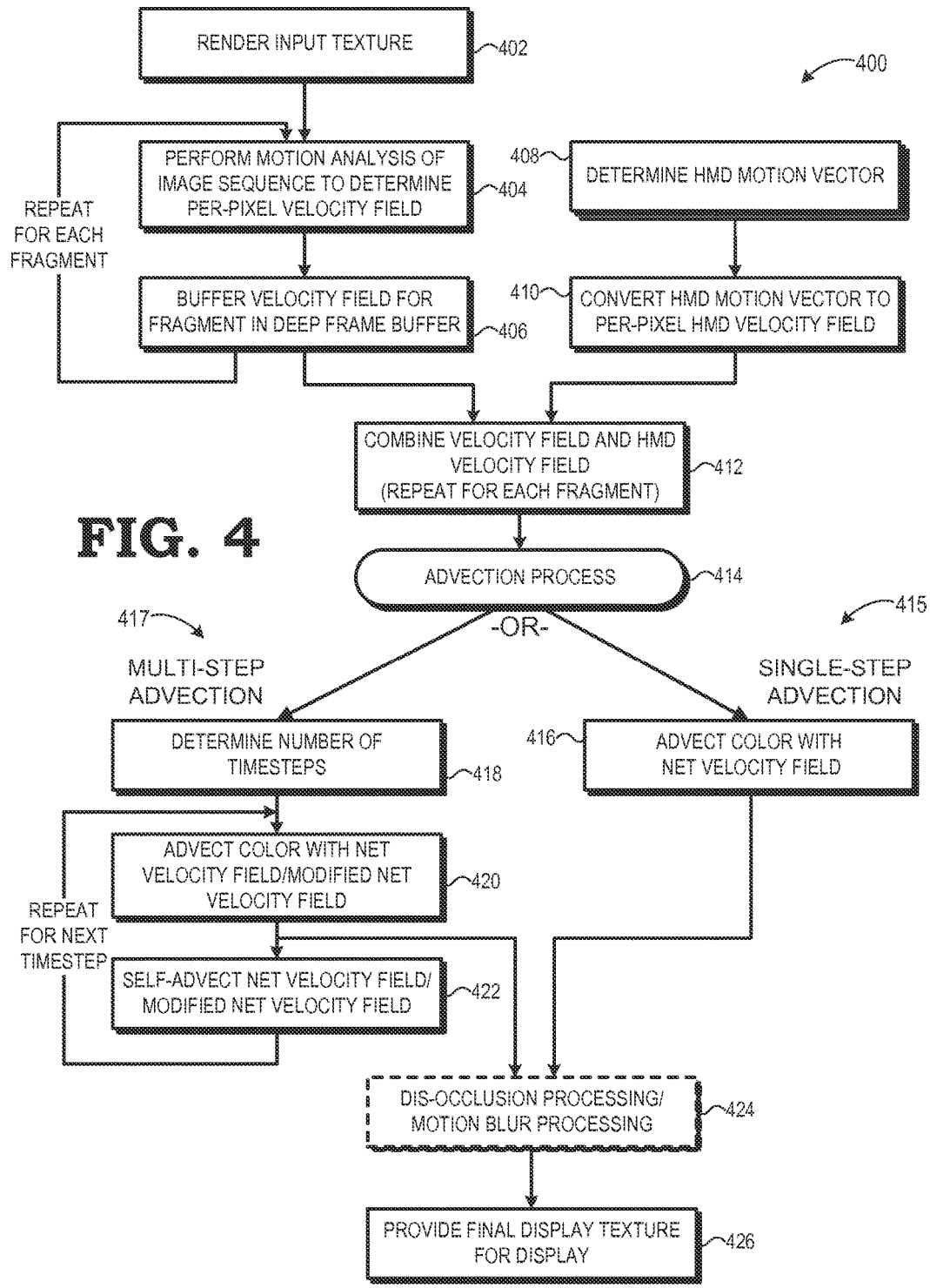
FIG. 4 is a flow diagram illustrating an example pixel-velocity-based EDS process in accordance with at least one embodiment of the present disclosure.

FIG. 4 illustrates an example method 400 implementing the EDS process 120 of FIG. 1 in the context of the HMD device 102 of FIG. 1 and the hardware configuration 200 of FIGS. 2 and 3. After the initiation of the display system 100 in preparation for the rendering and display of AR or VR content, the method 400 initiates at block 402 with the VR/AR application 202 triggering the rendering of an input texture 322 (FIG. 3) based on the current or anticipated pose of the HMD device 102. The input texture 322 includes color information (color field 323) for each pixel of a picture or frame, and in the event that multiple fragments are tracked, color information for each fragment associated with the pixel. The input texture 322 further may include a depth field 324 (also known as a "depth buffer") that stores a depth value or depth order for each of some or all of the fragments represented by a pixel.

At block 404, the motion analysis module 302 analyzes the input texture 322 and one or more preceding input textures (in display order) to determine the per-pixel velocity $V_p$ for each pixel based on the motion of one or more objects represented in the progression from the one or more preceding input textures and the current input texture 322.

Any of a variety of motion analysis processes may be utilized. For example, the motion analysis module 302 may employ any of a variety of optical flow algorithms to determine the per-pixel velocity, such as optical flow algorithm based one or more of the Lucas-Kanade method, the Buxton-Buxton method, the Black-Jepson method, and the like. Depending on the motion analysis employed and the information available, the pixel velocity Vp may comprise a 2D velocity (e.g., speed and direction in the x-y plane constituting the screen space), a 3D velocity (e.g., speed and direction in the x-y-z world space), or a 3D velocity in addition to rotational velocity around one or more of the three positional axes.

At block 406 the motion analysis module 302 buffers the per-pixel velocities Vp for the pixels constituting the input texture 322 as a pixel velocity field 328 (one embodiment of the pixel velocity field 128, FIG. 1) in the deep frame buffer 232 in association with the color field 323 for the input texture 322. As noted above, some or all of the pixels may be associated with multiple fragments, in which case the process of blocks 404 and 406 is repeated for each fragment, resulting in a pixel velocity VP being stored in the pixel velocity field 328 for each fragment represented by a corresponding pixel, and with each pixel velocity VP for a given pixel being stored in depth order in the corresponding entry of the pixel velocity field 328.

In parallel with the motion analysis process represented by the one or more iterations of blocks 404 and 406, at block 408 the compositor 224 determines the HMD motion vector $MV_{HMD}$ representing one or both of the instantaneous motion or predicted motion of the HMD device 102. To this end, in one embodiment the sensor integrator module 304 continually receives sensor samples 331 from one or more of the sensors of the IMU 210 and buffers the sensor samples 331 in a sliding window buffer (not shown). The sensor integrator module 304 operates to determine a transformation matrix, or quaternion plus motion vector pair, or other representation of the current motion vector $MV_{HMD}$, such as through forward integration of some or all of the sensor samples 331 in the sliding window buffer. Depending on the sensor information available and the particular configuration, this motion vector $MV_{HMD}$ may represent a motion vector representing a linear velocity of the HMD device 102 along one or more axes, a rotational velocity of the HMD device 102 along one or more axes, or a combination of linear velocity and rotational velocity (e.g., a 6DoF motion vector).

At block 410, the transform module 306 transforms the HMD motion vector $MV_{HMD}$ to a per-pixel velocity representation Vh and stores the resulting per-pixel HMD velocities Vh in a HMD velocity field 330 (one embodiment of the HMD velocity field 132, FIG. 1). In at least one embodiment, the transform module 306 may implement this conversion via application of a virtual-world-space-to-screen-space transform that converts the HMD motion vector $MV_{HMD}$ from the virtual world space coordinate system to the screen space coordinate system. In some embodiments, this transform may be implemented as a homography transform, although this approach would be only an approximation that assumes the scene is at uniform depth. A more accurate (and more computationally expensive) transformation includes accounting for the depth of every fragment (essentially treating each fragment as a 3D point), and subtracting the HMD pose velocity vector from the per fragment velocity vector (assuming both are in virtual world space) to get a HMD-relative fragment velocity vector that could then be transformed into a screen space velocity vector. This approach thus adds the velocities in virtual world space and then transforms to screen space; in a different approach, the velocities could be transformed to screen space first and then add the velocities in screen space.

With the pixel velocity field 328 and HMD velocity field 330 determined for the present iteration, at block 412 the velocity field combination module 308 combines the two velocity fields 328, 330 to generate a net velocity field 332 (one embodiment of net velocity field 136, FIG. 1), which may be stored in the deep frame buffer 232 or other storage component. In at least one embodiment, this combination involves summing, for each pixel, the pixel velocity Vp from the pixel velocity field 328 with the HMD velocity Vh for that same pixel position from the HMD velocity field 330 to generate a corresponding net pixel velocity Vnet for that pixel position. In the event that the pixel represents multiple fragments, a different net pixel velocity Vnet is calculated for each fragment (that is, Vnet[P,F]=Vp[P,F]+Vh[P] for the fragment F at pixel position P).

At block 414, the advection module 310 performs an implementation of the texture advection process 138 to modify the input texture 322 to reflect the per-pixel net velocities Vnet in the net velocity field 332 for a corresponding time span. In some embodiments, the advection process 138 may be implemented in one of two ways: a single-step advection process 415 or a multi-step advection process 417. The single-step advection process 415 represents a less accurate, but computationally less complex manner of representing the net motion. In contrast, the multi-step advection process represents a more accurate, but more computationally complex process.

The single-step advection process 415 is represented by block 416, whereupon the advection module 310 advects the color information (color field 323) of the input texture 322 using the net pixel velocities Vnet of the net velocity field 332 using any of a variety of well-known particle/velocity advection processes, such as an advection process based on the Lagrangian-Eulerian texture advection method or based on a Semi-Lagrangian method. In the event that multiple fragments are represented by some or all of the pixel positions, this advection process is repeated for each depth/fragment. Further, in the event that the input texture 322 includes depth information for one or more fragments, the depth information may likewise be advected based on the net velocity field 332 to maintain the correlation between the pixels and the depth information. For this process, the timespan or timestep represented in the advection process may be, or be based on, the expected duration between the rendering of the input texture 322 and the scan out or display of a corresponding display texture 334 (one embodiment of display texture 140, FIG. 1) generated from the input texture 322 as a result of the EDS process described herein. The display image then may be processed to reproject the texture into screen space to generate a final image to be displayed via the corresponding display controller The multi-step advection process 417 initiates at block 418 with the determination of the number of timesteps, or iterations, to be implemented in current instance of the multi-step advection process. In at least one embodiment, the number of timesteps is determined based on the ratio of the render rate X of the input textures to the calculation rate Y of the net velocity field 332. To illustrate, if the render rate is 60 fps and a new net velocity field 332 is determined 120 times per second, the multi-step advection process would have effectively 120 timesteps per second. If the render rate is 60 fps and a new net velocity field 332 is determined at 240 times per second, the multi-step advection process would have 240 timesteps per second.

With the number of timesteps determined, a first iteration of the process is initiated at block 420 whereupon the advection module 310 advects the color field 323 of the current input texture 322 with the net velocity field 332 to generate a display texture 334 for the current iteration (which is then displayed as described below). Assuming there is more than one iteration, next at the second iteration of block 422 the advection module 310 advects the net velocity field 332 with itself (that is, self-advects the net velocity field 332) to generate a modified net velocity field. For the next timestamp, the next input texture 322 is rendered at block 404 and at the second iteration of block 420 the advection module 310 then advects this next input texture 322 with the modified net velocity field to generate a second display texture 334. If there is a third timestamp, the modified net velocity field is self-advected at a second iteration of block 422 to generate a twice-modified net velocity field. Then, for a third iteration the next input texture 322 rendered at a third iteration of block 402 is advected with the twice-modified net velocity field at a third iteration of block 420 to generate a third display texture 334, and so on.

As some or all of the pixels of an input texture may represent multiple fragments, the repositioning of pixels as a result of the advection process may result in disocclusion of previously-occluded fragments at lower depths. If reduced computational complexity is desired, these disocclusion errors may be ignored. However, in some embodiments, at block 424 the disocclusion module 312 may utilize the depth information represented in the depth field 324, the information on the multiple fragments, and any of a variety of well-known disocclusion processes to remove disocclusion errors that may arise as a result of the advection process. Further, in some embodiments the disocclusion module 312 or another module may create motion blur to reduce perception issues by blending the display texture 334 with the input texture 322 from which it was generated, and use the resulting blended texture as the display texture. Each display texture 334 generated by an iteration of the advection process of block 414 (and which may be disoccluded and/or motion blurred via an iteration of block 424) is then, at block 426, re-projected in screen space to generate a final, or display, image that is provided by the compositor 224 to the corresponding display controller 228, 230 for scan out to the corresponding one of the displays 112, 114.

Much of the inventive functionality and many of the inventive principles described above are well suited for implementation with or in integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", "computer program", "application", or "software" may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In a system having a head mounted display (HMD) device, a method comprising:
rendering a first texture;
determining a first velocity field having a pixel velocity for at least a subset of pixels of the first texture;
determining a motion vector for the HMD device;
determining a second velocity field comprising a per-pixel velocity representation of the motion vector for the HMD device;
combining the first velocity field and the second velocity field to generate a third velocity field;
rendering a second texture based on the first texture and the third velocity field; and
providing the second texture for display at the HMD device.

2. The method of claim 1, wherein rendering the second texture comprises:
advecting color information for pixels of the first texture using the third velocity field to generate the second texture.

3. The method of claim 2, wherein rendering the second texture further comprises:
advecting depth information for pixels of the first texture using the third velocity field to generate the second texture.

4. The method of claim 2, further comprising:
rendering a third texture;
rendering a fourth texture by:
self-advecting the third velocity field to generate a fourth velocity field; and
advecting color information for pixels of the third texture using the fourth velocity field to generate the fourth texture; and
providing the fourth texture for display at the HMD device.

5. The method of claim 1, wherein determining the second velocity field comprises:
applying a virtual-world-space-to-screen-space transform to the motion vector for the HMD device to generate the second velocity field.

6. The method of claim 1, wherein:
each pixel of at least a subset of pixels of the first texture is associated with a corresponding set of at least two fragments; and
determining the first velocity field comprises determining, for each pixel of at least the subset, a separate pixel velocity of the pixel for each fragment of the corresponding set of at least two fragments.

7. The method of claim 6, further comprising:
storing the first texture in a deep frame buffer, the deep frame buffer further comprising the first velocity field and depth information for pixels of the first texture.

8. The method of claim 7, wherein rendering the second texture further comprises:
removing disocclusion errors in the second texture based on the depth information.

9. The method of claim 1, wherein determining the first velocity field comprises:
determining the first velocity field based on an optical flow analysis of a sequence of textures that includes the first texture.

10. A system comprising:
a head mounted display (HMD) device comprising at least one display;
at least one sensor to provide pose information for the HMD device;
a sensor integrator module coupled to the at least one sensor, the sensor integrator module to determine a motion vector for the HMD device based on the pose information;
an application processor to render a first texture based on pose of the HMD device determined from the pose information;
a motion analysis module to determine a first velocity field having a pixel velocity for at least a subset of pixels of the first texture;
a transform module to determine a second velocity field comprising a per-pixel velocity representation of the motion vector for the HMD device;
a velocity field combination module to combine the first velocity field and the second velocity field to generate a third velocity field; and
a compositor to render a second texture based on the first texture and the third velocity field, and to provide the second texture to the display of the HMD device.

11. The system of claim 10, wherein the compositor comprises:
an advection module to advect color information for pixels of the first texture using the third velocity field to generate the second texture.

12. The system of claim 11, wherein:
the advection module further is to advect depth information for pixels of the first texture using the third velocity field to generate the second texture.

13. The system of claim 11, wherein:
the application processor further is to render a third texture; and
the compositor further is to render a fourth texture by:
self-advecting the third velocity field to generate a fourth velocity field; and
advecting color information for pixels of the third texture using the fourth velocity field to generate the fourth texture; and
wherein the compositor is to provide the fourth texture for display at the HMD device.

14. The system of claim 10, wherein:
the transform module is to determine the second velocity field by applying a homography transform to the motion vector for the HMD device to generate the second velocity field.

15. The system of claim 10, wherein:
each pixel of at least a subset of pixels of the first texture is associated with a corresponding set of at least two fragments; and
the motion analysis module is to determine the first velocity field by determining, for each pixel of at least the subset, a separate pixel velocity of the pixel for each fragment of the corresponding set of at least two fragments.

16. The system of claim 15, further comprising:
a deep frame buffer to store the first texture, the first velocity field, and depth information for pixels of the first texture.

17. The system of claim 16, further comprising:
a disocclusion module to remove disocclusion errors in the second texture based on the depth information.

18. The system of claim 10, wherein:
the motion analysis module is to determine the first velocity field based on an optical flow analysis of a sequence of textures that includes the first texture.

19. A non-transitory computer readable medium storing a set of instructions that, when executed by at least one processor, manipulate the at least one processor to perform a process comprising:
rendering a first texture;
determining a first velocity field having a pixel velocity for at least a subset of pixels of the first texture;
determining a motion vector for a head mounted display (HMD) device;
determining a second velocity field comprising a per-pixel velocity representation of the motion vector for the HMD device;
combining the first velocity field and the second velocity field to generate a third velocity field;
rendering a second texture based on the first texture and the third velocity field; and
providing the second texture for display at the HMD device.

20. The non-transitory computer readable medium of claim 19, wherein rendering the second texture comprises:
advecting color information for pixels of the first texture using the third velocity field to generate the second texture.

21. The non-transitory computer readable medium of claim 20, wherein the process further comprises:
rendering a third texture;
rendering a fourth texture by:
self-advecting the third velocity field to generate a fourth velocity field; and
advecting color information for pixels of the third texture using the fourth velocity field to generate the fourth texture; and
providing the fourth texture for display at the HMD device.

22. The non-transitory computer readable medium of claim 19, wherein determining the second velocity field comprises:
applying a virtual-world-space-to-screen-space transform to the motion vector for the HMD device to generate the second velocity field.

23. The non-transitory computer readable medium of claim 19, wherein:
each pixel of at least a subset of pixels of the first texture is associated with a corresponding set of at least two fragments; and
determining the first velocity field comprises determining, for each pixel of at least the subset, a separate pixel velocity of the pixel for each fragment of the corresponding set of at least two fragments.

24. The non-transitory computer readable medium of claim 23, wherein the process further comprises:
storing the first texture in a deep frame buffer, the deep frame buffer further comprising the first velocity field and depth information for pixels of the first texture.

* * * * *